(12) United States Patent
Maeda et al.

(10) Patent No.: US 7,919,140 B2
(45) Date of Patent: Apr. 5, 2011

(54) PROCESS FOR PRODUCING PRESSURE-SENSITIVE ADHESIVE LAYER

(75) Inventors: Kazuhisa Maeda, Ibaraki (JP); Isao Hirose, Ibaraki (JP); Kunio Nagasaki, Ibaraki (JP)

(73) Assignee: Nitto Denko Corporation, Osaka (JP)

( * ) Notice: Subject to any disclaimer, the term of this patent is extended or adjusted under 35 U.S.C. 154(b) by 436 days.

(21) Appl. No.: 12/162,736

(22) PCT Filed: Jan. 31, 2008

(86) PCT No.: PCT/JP2008/051505
§ 371 (c)(1),
(2), (4) Date: Jul. 30, 2008

(87) PCT Pub. No.: WO2008/096661
PCT Pub. Date: Aug. 14, 2008

(65) Prior Publication Data
US 2009/0023832 A1    Jan. 22, 2009

(30) Foreign Application Priority Data
Feb. 5, 2007   (JP) .............................. P.2007-025116

(51) Int. Cl.
C08J 3/28   (2006.01)
C08F 2/46   (2006.01)
C09D 5/00   (2006.01)
C09D 5/20   (2006.01)

(52) U.S. Cl. ........ 427/154; 427/496; 427/505; 427/508; 427/516; 427/155; 427/156; 522/168; 522/170; 522/178; 522/181; 522/182; 522/150; 522/153; 522/154

(58) Field of Classification Search .................. 522/150, 522/153, 168, 170, 178, 181, 182, 902; 427/154, 427/508, 515, 155, 156, 516, 505
See application file for complete search history.

(56) References Cited

U.S. PATENT DOCUMENTS 4,072,527 A * 2/1978 Fan ............................ 430/273.1
4,156,035 A * 5/1979 Tsao et al. ..................... 427/506
(Continued)

FOREIGN PATENT DOCUMENTS

JP         51-96050 U       8/1976
(Continued)

OTHER PUBLICATIONS

International Search Report dated Mar. 4, 2008.

Primary Examiner — Sanza L McClendon
(74) Attorney, Agent, or Firm — Sughrue Mion, PLLC

(57) ABSTRACT

The present invention relates to a process for producing a pressure-sensitive adhesive layer, which includes irradiating a photopolymerizable acrylic pressure-sensitive adhesive composition layer provided between two films with an active energy beam to polymerize the photopolymerizable acrylic pressure-sensitive adhesive composition layer, in which the polymerization is performed while a layer of a composition for preventing polymerization inhibition which is curable with an active energy beam in the atmosphere is provided on a side surface of the photopolymerizable acrylic pressure-sensitive adhesive composition layer. According to the process for producing a pressure-sensitive adhesive layer of the present invention, owing to the construction as discussed above, it is possible to reuse a film. Moreover, it is possible to prevent a lowering in the cohesive force in the side surface of the thus formed pressure-sensitive adhesive composition layer caused by a lowering in the polymerization degree in the side surface of the photopolymerizable acrylic pressure-sensitive adhesive composition layer during the photopolymerization.

7 Claims, 1 Drawing Sheet

U.S. PATENT DOCUMENTS

| | | | |
|---|---|---|---|
| 4,181,752 A | | 1/1980 | Martens et al. |
| 4,728,005 A | * | 3/1988 | Jacobs et al. .................... 222/64 |
| 5,070,117 A | * | 12/1991 | Klemarczyk et al. ........... 522/31 |
| 5,149,592 A | * | 9/1992 | Wojnarowicz ................ 428/447 |
| 5,366,573 A | * | 11/1994 | Bayer et al. ..................... 156/64 |
| 5,910,536 A | * | 6/1999 | Kydonieus et al. ........... 524/590 |
| 5,912,059 A | * | 6/1999 | Jones et al. .................. 428/35.2 |
| 6,054,251 A | * | 4/2000 | Imai et al. .................. 430/285.1 |
| 7,141,615 B2 | * | 11/2006 | Scranton et al. .............. 522/178 |
| 2007/0137782 A1 | * | 6/2007 | Matsumura et al. ....... 156/275.7 |

FOREIGN PATENT DOCUMENTS

| | | | |
|---|---|---|---|
| JP | 03-285975 A | | 12/1991 |
| JP | 05096630 A | * | 4/1993 |
| JP | 11-116905 A | | 4/1999 |
| JP | 2002-371249 A | | 12/2002 |

* cited by examiner

US 7,919,140 B2

PROCESS FOR PRODUCING PRESSURE-SENSITIVE ADHESIVE LAYER

TECHNICAL FIELD

The present invention relates to a process for producing a pressure-sensitive adhesive layer which prevents polymerization inhibition by atmospheric oxygen to enable the reuse of a film.

BACKGROUND ART

In general, an acrylic polymer used as a base polymer of an acrylic adhesive (pressure-sensitive adhesive) has been prepared by a solution polymerization of a monomer mixture including a (meth)acrylic acid ester as a main monomer component. However, due to constraints in the safety of organic solvents and environmental sanitation, emulsion polymerization and photopolymerization have been frequently employed in recent years.

Particularly, there is a problem that acrylic pressure-sensitive adhesives prepared by emulsion polymerization cannot offer equivalent or superior performance to acrylic pressure-sensitive adhesives prepared by solution polymerization. On the other hand, acrylic pressure-sensitive adhesives prepared by photopolymerization are advantageous because they are capable of offering equivalent or superior performance to acrylic pressure-sensitive adhesives prepared by solution polymerization.

Since radical polymerization of a (meth)acrylic acid ester monomer is inhibited by oxygen, it is difficult to perform the polymerization in the atmosphere in some cases. Thus, a process which includes conducting ultraviolet light polymerization (UV polymerization) in an inert gas stream such as a nitrogen gas stream has been proposed (see Patent Document 1). However, this process has a problem that a change in the monomer composition of a photopolymerizable composition caused by the inert gas stream results in variation in the pressure-sensitive adhesive properties between the front surface of the pressure-sensitive adhesive and the back surface thereof.

There has been known another process for producing a pressure-sensitive adhesive tape or sheet (hereinafter "a tape or sheet" is merely referred to "a tape" or "a sheet" in some cases) which includes preparing a monomer mixture including a (meth)acrylic acid ester as a main monomer component to have a coatable viscosity, coating the mixture to a light-permeable substrate such as a polyethylene terephthalate (PET) film, and then irradiating it with ultraviolet light (UV light) to thereby form an adhesive layer (pressure-sensitive adhesive layer) on the substrate (see Patent Document 2). Although this process is free from such a problem as described above, there arises another problem that the light permeable film (transparent film) should be peeled after the completion of the polymerization, thereby increasing in cost in case of discarding the film after one use. Therefore, reusing such a peeled film has been considered by definition.

Even though the monomer mixture layer (pressure-sensitive adhesive composition layer) as described above is sandwiched between films, the side surfaces thereof are exposed to the atmosphere. Although it causes no problem in case of a thin monomer mixture layer, the area being in contact with oxygen in the atmosphere is enlarged with an increase in the thickness of the monomer mixture layer as described above. As a result, there arises a problem that the polymerization degree in the side surfaces (side edge parts) of the above-described monomer mixture layer is lowered at the photopolymerization (photo-curing) due to the polymerization inhibition by atmospheric oxygen and thus the cohesive force in the side surface of the thus formed pressure-sensitive adhesive layer is lowered. Accordingly, when a film is peeled off from the pressure-sensitive adhesive layer, a part of the side surface of the pressure-sensitive adhesive layer remains on the film, thereby being impossible to reuse the film.

Patent Document 1: JP-A-3-285975
Patent Document 2: U.S. Pat. No. 4,181,752

DISCLOSURE OF THE INVENTION

Accordingly, an object of the present invention is to provide a process for producing a pressure-sensitive adhesive layer, which includes irradiating a photopolymerizable acrylic pressure-sensitive adhesive composition layer provided between two films with an active energy beam to polymerize the photopolymerizable acrylic pressure-sensitive adhesive composition layer, thereby forming a pressure-sensitive adhesive layer, by which the reuse of the films is enabled.

Another object of the present invention is to provide a process for producing a pressure-sensitive adhesive layer which includes irradiating a photopolymerizable acrylic pressure-sensitive adhesive composition layer provided between two films with an active energy beam to polymerize the photopolymerizable acrylic pressure-sensitive adhesive composition layer, thereby forming a pressure-sensitive adhesive layer, by which it is possible to prevent a lowering in the cohesive force in the side surface of the thus formed pressure-sensitive adhesive layer caused by a lowering in the polymerization degree in the side surface of the acrylic pressure-sensitive adhesive composition layer during the photopolymerization.

The present inventors have made intensive studies to solve the problems as described above. As a result, they have found that, in a process for producing a pressure-sensitive adhesive layer which includes irradiating a photopolymerizable acrylic pressure-sensitive adhesive composition layer provided between two films with an active energy beam to polymerize the photopolymerizable acrylic pressure-sensitive adhesive composition layer, thereby forming a pressure-sensitive adhesive layer, polymerization inhibition by atmospheric oxygen generating in the course of irradiating the active energy beam to polymerize the photopolymerizable acrylic pressure-sensitive adhesive composition layer can be prevented by providing a layer of a composition for preventing polymerization inhibition in the state of being in contact with the side surface of the photopolymerizable acrylic pressure-sensitive adhesive composition layer. The present invention has been thus completed.

Accordingly, the present invention provides a process for producing a pressure-sensitive adhesive layer which includes irradiating a photopolymerizable acrylic pressure-sensitive adhesive composition layer provided between two films with an active energy beam to polymerize the photopolymerizable acrylic pressure-sensitive adhesive composition layer, in which the polymerization is performed while a layer of a composition for preventing polymerization inhibition which is curable with an active energy beam in the atmosphere is provided on a side surface of the photopolymerizable acrylic pressure-sensitive adhesive composition layer.

It is preferable that the distance between the two films is 0.2 mm or more.

It is preferable that the composition for preventing polymerization inhibition is a photo-cationic-polymerizable composition or a radical-polymerizable composition containing 1 to 10 parts by weight of a photopolymerization initiator based on 100 parts by weight of the total monomer components.

It is preferable that the photo-cationic-polymerizable composition contains an oxetane compound or an epoxy compound.

It is preferable that the radical-polymerizable composition further contains 0.2 to 10 parts by weight of a polyfunctional monomer based on 100 parts by weight of the total monomer components. It is preferable that the radical-polymerizable composition furthermore contains 0.1 to 1 part by weight of a thiol monomer based on 100 parts by weight of the total monomer components.

According to the process for producing a pressure-sensitive adhesive layer of the present invention, owing to the construction as discussed above, it is possible to reuse a film. Moreover, it is possible to prevent a lowering in the cohesive force in the side surface of the thus formed pressure-sensitive adhesive composition layer caused by a lowering in the polymerization degree in the side surface of the photopolymerizable acrylic pressure-sensitive adhesive composition layer during the photopolymerization.

DESCRIPTION OF THE REFERENCE NUMERALS AND SIGNS

Figure 1:
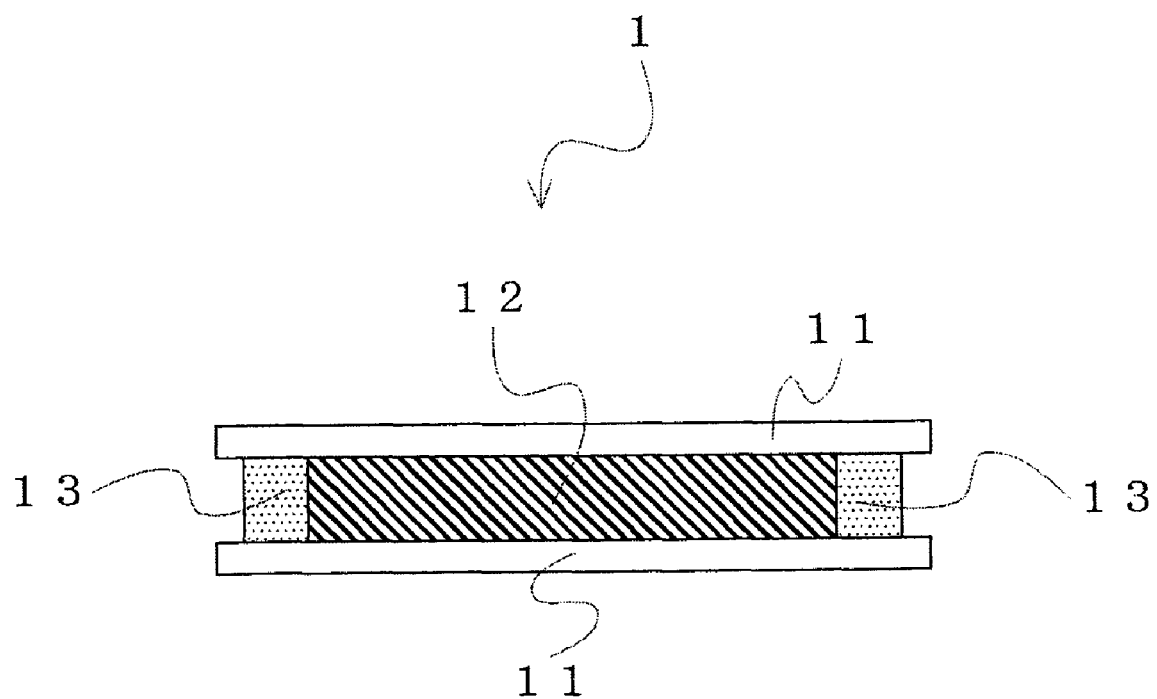
FIG. 1 is a schematic cross-sectional view showing an example of a photopolymerizable acrylic pressure-sensitive composition layer sheet.

1 photopolymerizable acrylic pressure-sensitive composition layer sheet provided with layer of composition for preventing polymerization inhibition
11 film
12 photopolymerizable acrylic pressure-sensitive composition layer
13 composition for preventing polymerization inhibition

BEST MODE FOR CARRYING OUT THE INVENTION

Pressure-Sensitive Adhesive Layer

Adhesive Layer

In a pressure-sensitive adhesive layer which is prepared by the present invention, the pressure-sensitive adhesive layer per se can be used as a substrate-less double-faced pressure-sensitive adhesive sheet. Further, by providing the pressure-sensitive adhesive layer on one or both surface of a substrate or the like, it can be used as a pressure-sensitive adhesive layer of a pressure-sensitive adhesive sheet having a substrate.

In the invention, as the pressure-sensitive adhesive constituting the pressure-sensitive adhesive layer, an acrylic pressure-sensitive adhesive can be preferably used. In general, an acrylic pressure-sensitive adhesive includes, as the base polymer, an acrylic polymer having a (meth)acrylic acid ester as the main monomer component. As the (meth)acrylic acid ester, an (meth)acrylic acid alkyl ester can be preferably used. Examples of such an (meth)acrylic acid alkyl ester include $C_{1-20}$ (meth)acrylic acid alkyl ester (preferably $C_{2-14}$ (meth)acrylic acid alkyl ester and more preferably $C_{2-10}$ (meth)acrylic acid alkyl ester) such as methyl (meth)acrylate, ethyl (meth)acrylate, propyl (meth)acrylate, isopropyl (meth)acrylate, butyl (meth)acrylate, isobutyl (meth)acrylate, s-butyl (meth)acrylate, t-butyl (meth)acrylate, pentyl (meth)acrylate, isopentyl (meth)acrylate, hexyl (meth)acrylate, heptyl (meth)acrylate, octyl (meth)acrylate, 2-ethylhexyl (meth)acrylate, isooctyl (meth)acrylate, nonyl (meth)acrylate, isononyl (meth)acrylate, decyl (meth)acrylate, isodecyl (meth)acrylate, undecyl (meth)acrylate, dodecyl (meth)acrylate, tridecyl (meth)acrylate, tetradecyl (meth)acrylate, pentadecyl (meth)acrylate, hexadecyl (meth)acrylate, heptadecyl (meth)acrylate, octadecyl (meth)acrylate, nonadecyl (meth)acrylate and eicosyl (meth)acrylate.

Examples of the (meth)acrylic acid ester other than the (meth)acrylic acid alkyl ester include (meth)acrylic acid esters having an alicyclic hydrocarbon group such as cyclopentyl (meth)acrylate, cyclohexyl (meth)acrylate and isobornyl (meth)acrylate, and (meth)acrylic acid esters having an aromatic hydrocarbon group such as phenyl (meth)acrylate.

These (meth)acrylic acid esters can be used alone or in combination thereof. Since the (meth)acrylic acid ester is employed as the main monomer component of the acrylic polymer, it is important that the amount of the (meth)acrylic acid ester (in particular, the (meth)acrylic acid alkyl ester) is, for example, 60 parts by weight or more (preferably 80 parts by weight or more) based on 100 parts by weight of the total monomer components for preparing the acrylic polymer.

In the above-mentioned acrylic polymer, various copolymerizable monomers such as a polar group-containing monomer or a polyfunctional monomer may be used as monomer components. It is possible to, for example, improve the adhesive force or enhance the cohesive force of the adhesive by using such a copolymerizable monomer as a monomer component. These copolymerizable monomers can be used alone or in combination thereof.

Examples of the polar group-containing monomer as described above include carboxyl group-containing monomers such as (meth)acrylic acid, itaconic acid, maleic acid, fumaric acid, crotonic acid and isocrotonic acid or anhydrides thereof (maleic anhydride, etc.); hydroxyl group-containing monomers such as hydroxyethyl (meth)acrylate, hydroxypropyl (meth)acrylate and hydroxybutyl (meth)acrylate; amide group-containing monomers such as acrylamide, methacrylamide, N,N-dimethyl(meth)acrylamide, N-methylol (meth)acrylamide, N-methoxymethyl(meth)acrylamide and N-butoxymethyl(meth)acrylamide; amino group-containing monomers such as aminoethyl (meth)acrylate, dimethylaminoethyl (meth)acrylate and t-butylaminoethyl (meth)acrylate; glycidyl group-containing monomers such as glycidyl (meth)acrylate and methylglycidyl (meth)acrylate; cyano group-containing monomers such as acrylonitrile and methacrylonitrile; and heterocycle-containing vinyl monomers such as N-vinyl-2-pyrrolidone and (meth)acryloylmorpholine and N-vinylpridine, N-vinylpiperidone, N-vinylpyrimidine, N-vinylpiperazine, N-vinylpyrazine, N-vinylpyrrole, N-vinylimidazole and N-vinyloxazole. As the polar group-containing monomer, a carboxyl group-containing monomer such as acrylic acid or anhydride thereof is preferred.

The polar group-containing monomer is used in an amount of 30 parts by weight or less (for example, 1 to 30 parts by weight), preferably 3 to 20 parts by weight, based on 100 parts by weight of the total monomer components for preparing the acrylic pressure-sensitive adhesive. When the amount of the polar group-containing monomer exceeds 30 parts by weight based on 100 parts by weight of the total monomer components for preparing the acrylic pressure-sensitive adhesive, there is a possibility that, for example, the cohesive force of the acrylic pressure-sensitive adhesive is excessively elevated and thus the pressure-sensitive adhesiveness of the pressure-sensitive adhesive is lowered. When the amount of the polar group-containing monomer is excessively small (for example, less than 1 part by weight based on 100 parts by weight of the total monomer components for preparing the acrylic pressure-sensitive adhesive), there is a possibility that, for example, the cohesive force of the acrylic pressure-sensitive adhesive is lowered and thus a high shear force cannot be obtained.

Examples of the above-mentioned polyfunctional monomer include hexanediol di(meth)acrylate, (poly)ethylene glycol di(meth)acrylate, (poly)propylene glycol di(meth)acrylate, neopentyl glycol di(meth)acrylate, pentaerythritol di(meth)acrylate, pentaerythritol tri(meth)acrylate, dipentaerythritol hexa(meth)acrylate, trimethylolpropane tri(meth)acrylate, tetramethylolmethane tri(meth)acrylate, allyl (meth)acrylate, vinyl (meth)acrylate, divinylbenzene, epoxy acrylate, polyester acrylate, urethane acrylate, butyl di(meth)acrylate and hexyl di(meth)acrylate.

The polyfunctional monomer is used in an amount of 2 parts by weight or less (for example, 0.01 to 2 parts by weight), preferably 0.02 to 1 part by weight, based on 100 parts by weight of the total monomer components for preparing the acrylic pressure-sensitive adhesive. When the amount of the polyfunctional monomer is exceeds 2 parts by weight based on 100 parts by weight of the total monomer components for preparing the acrylic pressure-sensitive adhesive, there is a possibility that, for example, the cohesive force of the acrylic pressure-sensitive adhesive is excessively elevated and thus the pressure-sensitive adhesiveness is lowered. When the amount of the polyfunctional monomer is excessively small (for example, less than 0.01 part by weight based on 100 parts by weight of the total monomer components for preparing the acrylic pressure-sensitive adhesive), there is a possibility that, for example, the cohesive force of the acrylic pressure-sensitive adhesive is lowered.

Examples of the copolymerizable monomers other than the polar group-containing monomers and polyfunctional monomers include vinyl esters such as vinyl acetate and vinyl propionate; aromatic vinyl compounds such as styrene and vinyl toluene; olefins or dienes such as ethylene, butadiene, isoprene and isobutylene; vinyl ethers such as vinyl alkyl ethers; vinyl chloride; alkoxyalkyl (meth)acrylate type monomers such as methoxyethyl (meth)acrylate and ethoxyethyl (meth)acrylate; sulfonate group-containing monomers such as sodium vinylsulfonate; phosphate group-containing monomers such as 2-hydroxyethyl acryloyl phosphate; imide group-containing monomers such as cyclohexylmaleimide and isopropylmaleimide; isocyanate group-containing monomers such as 2-methacryloyloxyethyl isocyanate; fluorine atom-containing (meth)acrylates; and silicone atom-containing (meth)acrylates.

In the present invention, a pressure-sensitive adhesive layer is formed by irradiating a photopolymerizable acrylic pressure-sensitive adhesive composition, containing at least a monomer component for preparing the base polymer in the acrylic pressure-sensitive adhesive and a photopolymerization initiator, with an active energy beam to thereby polymerize (cure) the photopolymerizable acrylic pressure-sensitive adhesive composition.

The photopolymerization initiator as described above is not particularly restricted. Examples of the photopolymerization initiator include a benzoin ether-based photopolymerization initiator, an acetophenone-based photopolymerization initiator, an α-ketol-based photopolymerization initiator, an aromatic sulfonyl chloride-based photopolymerization initiator, a photo active oxime-based photopolymerization initiator, a benzoin-based photopolymerization initiator, a benzyl-based photopolymerization initiator, a benzophenone-based photopolymerization initiator, a ketal-based photopolymerization initiator or a thioxanthone-based photopolymerization initiator.

Specifically, examples of the benzoin ether-based photopolymerization initiator include benzoin methyl ether, benzoin ethyl ether, benzoin propyl ether, benzoin isopropyl ether, benzoin isobutyl ether, 2,2-dimethoxy-1,2-diphenylethan-1-one and anisole methyl ether. Examples of the acetophenone-based photopolymerization initiator include 2,2-diethoxyacetophenone, 2,2-dimethoxy-2-phenylacetophenone, 1-hydroxycyclohexyl phenyl ketone, 4-phenoxydichloroacetophenone and 4-t-butyl-dichloroacetophenone. Examples of the α-ketol-based photopolymerization initiator include 2-methyl-2-hydroxypropiophenone and 1-(4-(2-hydroxyethyl)-phenyl)-2-hydroxy-2-methylpropan-1-one. Examples of the aromatic sulfonyl chloride-based photopolymerization initiator include 2-naphthalenesulfonyl chloride. Examples of the photo active oxime-based photopolymerization initiator include 1-phenyl-1,1-propanedion-2-(o-ethoxycarbonyl)-oxime.

Examples of the benzoin-based photopolymerization initiator include benzoin. Examples of the benzyl-based photopolymerization initiator include benzyl. Examples of the benzophenone-based photopolymerization initiator include benzophenone, benzoyl benzoic acid, 3,3'-dimethyl-4-methoxybenzophenone, polyvinyl benzophenone and α-hydroxycyclohexyl phenyl ketone. Examples of the ketal-based photopolymerization initiator include benzyl dimethyl ketal. Examples of the thioxanthone-based photopolymerization initiator include thioxanthone, 2-chlorothioxanthone, 2-methylthioxanthone, 2,4-dimethylthioxanthone, isopropylthioxanthone, 2,4-dichlorothioxanthone, 2,4-diethylthioxanthone, 2,4-diisopropylthioxanthone and dodecylthioxanthone.

The amount of the photopolymerization initiator is not particularly restricted. For example, it can be used in an amount selected from the range of 0.001 to 1 part by weight (preferably 0.01 to 0.8 parts by weight) based on 100 parts by weight of the total monomer components in the photopolymerizable acrylic pressure-sensitive adhesive composition. These photopolymerization initiators can be used alone or in combination thereof.

In activating the photopolymerization initiator, it is important to irradiate the photopolymerizable acrylic pressure-sensitive adhesive composition with an active energy beam. Examples of the active energy beam include ionizing radiations such as α-ray, β-ray, γ-ray, neutron ray and electron ray and ultraviolet light. Of these, ultraviolet light is preferable. The irradiation energy, irradiation time, irradiation method, etc. of the active energy beam are not particularly restricted so long as the photopolymerization initiator can be activated to generate the monomer components.

In the present invention, the pressure-sensitive adhesive layer may contain additives such as a thickener, a thixotropic agent, a bulking agent, a filler, a tackifier (a tackifying resin), a plasticizer, an antiaging agent, an antioxidant, a colorant (a pigment, a dye, etc.), a surfactant and a crosslinking agent. Since the pressure-sensitive adhesive layer is formed via the photopolymerization induced by irradiating the photopolymerizable acrylic pressure-sensitive adhesive composition with the active energy beam, it is important that such an additive as described above is added, if required, to the photopolymerizable acrylic pressure-sensitive adhesive composition within such a range as not inhibiting the photopolymerizability thereof.

Examples of the thickener include acrylic rubber, epichlorohydrin rubber and butyl rubber. Examples of the tixotropic agent include colloidal silica and polyvinylpyrrolidone. Examples of the bulking agent include calcium carbonate, titanium oxide and clay. Examples of the filler include inorganic hollow materials such as glass balloon, alumina balloon and ceramic balloon, organic hollow materials such as vinylidene chloride balloon and acryl balloon, organic spherical materials such as nylon beads, acryl beads and silicone beads, single filaments of polyester, rayon, nylon, etc. and micropowders of polyethylene, polypropylene, etc. Examples of the surfactant include ionic surfactants, silicone-based surfactants and fluorinated surfactants. Examples of the crosslinking agent include a polyisocyanate-based crosslinking agent, a silicone-based crosslinking agent, an epoxy-based crosslinking agent and an alkyl-etherified melamine-based crosslinking agent. The tackifier is not particularly restricted so long as it does not substantially inhibit the polymerization. Examples thereof include a rosin-based resin, a terpene-based resin, an aliphatic petroleum resin, an aromatic petroleum resin, a copolymerized petroleum resin, an alicyclic petroleum resin, a xylene resin and an elastomer.

The pressure-sensitive adhesive layer may contain cells. When the pressure-sensitive adhesive layer contains cells, the pressure-sensitive adhesive layer can exert an excellent adhesiveness to a curved face or a non-flat face and also can show high repulsion resistance.

It is fundamentally preferable that the cells contained in the pressure-sensitive adhesive layer are closed cells. However, there may be closed cells together with interconnected cells.

Although these cells usually have a spherical (in particular, completely spherical) shape, they may be in an irregular spherical shape. The average cell size (diameter) of the above-described cells is not particularly restricted. For example, it may be selected from the range of from 1 to 1000 μm (preferably from 10 to 500 μm and more preferably from 30 to 300 μm).

The gas component contained in the cells (the gas component forming the cells; hereinafter sometimes referred to as "cell-forming gas") is not particularly restricted. Thus, examples of the gas component include an inert gas such as nitrogen, carbon dioxide or argon or various gas components including air. In the case where the reaction such as polymerization is conducted in the state of containing a cell-forming gas, it is important to employ a gas which would never inhibit the reaction as the cell-forming gas. From the viewpoints of not inhibiting the reaction, cost and so on, nitrogen is suitable as the cell-forming gas.

The amount of the cells in the pressure-sensitive adhesive layer is not particularly restricted but can be appropriately selected depending on, for example, the purpose of the use of the pressure-sensitive adhesive tape using the pressure-sensitive adhesive layer. For example, the cell amount may be adjusted to 10% or more (preferably 11% or more and more preferably 12% or more) based on the total volume of the pressure-sensitive adhesive layer. The upper limit of the amount of the cells in the pressure-sensitive adhesive layer is not particularly restricted and may be controlled to, for example, 50% or less (preferably 40% or less and more preferably 30% or less).

In the pressure-sensitive adhesive layer containing cells as described above (hereinafter sometimes referred to as "cell-containing pressure-sensitive adhesive layer"), the cells may be formed in an arbitrary state without specific restriction. Examples of the cell-containing pressure-sensitive adhesive layer include (1) a cell-containing pressure-sensitive adhesive layer in which cells are formed by using a photopolymerizable acrylic pressure-sensitive adhesive composition to which a cell-forming gas component (cell-forming gas) has been preliminarily added (hereinafter sometimes referred to as "cell-containing photopolymerizable acrylic pressure-sensitive adhesive composition"), and (2) a cell-containing pressure-sensitive adhesive layer in which cells are formed by using a photopolymerizable acrylic pressure-sensitive adhesive composition containing a blowing agent. As the cell-containing pressure-sensitive adhesive layer in the present invention, a cell-containing pressure-sensitive adhesive layer in which cells are formed by using a cell-containing photopolymerizable acrylic pressure-sensitive adhesive composition is preferred. The amount of the cells in the cell-containing photopolymerizable acrylic pressure-sensitive adhesive composition may be appropriately selected from the range corresponding to the cell content of the cell-containing pressure-sensitive adhesive layer.

In case where the cell-containing pressure-sensitive adhesive layer is a cell-containing pressure-sensitive adhesive layer in which cells are formed by using a photopolymerizable acrylic pressure-sensitive adhesive composition containing a blowing agent, the blowing agent may be appropriately selected from conventional blowing agents without specific restriction. Examples of the blowing agent include heat-expandable microspheres.

The pressure-sensitive adhesive layer may have either a monolayer structure or a multilayer structure. In the present invention, the thickness of the pressure-sensitive adhesive layer is not particularly restricted but can be selected from the range of, for example, from 200 to 5000 μm (preferably from 400 to 3000 μm).

In the present invention, a layer of a composition for preventing polymerization inhibition is formed on the side surface of a photopolymerizable acrylic pressure-sensitive adhesive composition layer provided between two films in order to prevent polymerization inhibition due to contact with the atmosphere in the course of the formation of the pressure-sensitive adhesive layer. Thus, it is possible to prevent a lowering in the cohesive force in the side surface of the thus formed pressure-sensitive adhesive layer caused by a lowering in the polymerization degree in the side surface of the photopolymerizable acrylic pressure-sensitive adhesive composition layer due to the polymerization inhibition by atmospheric oxygen during the photopolymerization. Thus, when the pressure-sensitive adhesive layer is peeled off from the film, a part of the side surface of the pressure-sensitive adhesive layer does not remain on the film even in case where the thus formed pressure-sensitive adhesive layer has a certain thickness (for example, a pressure-sensitive adhesive layer of 0.2 mm or more). When such a thick pressure-sensitive adhesive layer (for example, a pressure-sensitive adhesive layer of 0.2 mm or more) as described above is formed, the distance between the two films is usually adjusted to 0.2 mm or more.

Composition for Preventing Polymerization Inhibition

The composition for preventing polymerization inhibition is a composition which is curable with an active energy beam in the atmosphere and cures to form a cured product when irradiated with the active energy beam in the atmosphere. The composition for preventing polymerization inhibition is provided in such a manner that, in the course of producing the pressure-sensitive adhesive layer by irradiating the photopolymerizable acrylic pressure-sensitive adhesive composition provided between two films with the active energy beam to polymerize the photopolymerizable acrylic pressure-sensitive adhesive composition, the composition for preventing polymerization inhibition comes into contact with the side surface of the photopolymerizable acrylic pressure-sensitive adhesive composition layer. Thus, the side surface of the photopolymerizable acrylic pressure-sensitive adhesive composition layer is prevented from the contact with atmospheric oxygen. As a result, it is possible to prevent the occurrence of the trouble (photopolymerization inhibition by atmospheric oxygen), namely, the cohesive force in the side surface of the thus formed pressure-sensitive adhesive layer is lowered by a lowering in the polymerization degree in the side surface of the photopolymerizable acrylic pressure-sensitive adhesive composition layer due to atmospheric oxygen during the photopolymerization. The photopolymerizable acrylic pressure-sensitive adhesive composition layer is prevented at both surfaces by the films from the contact with atmospheric oxygen.

The composition for preventing polymerization inhibition is not particularly restricted so long as it is capable of preventing the side surface of the photopolymerizable acrylic pressure-sensitive adhesive composition layer from the contact with atmospheric oxygen. As a composition for preventing polymerization inhibition, radical-polymerizable composition and photo-cationic-polymerizable composition may be mentioned. A radical-polymerizable composition is particularly preferred. These compositions for preventing polymerization inhibition can be used alone or in combination thereof.

The radical-polymerizable composition is not particularly restricted so long as it is capable of undergoing polymerization when irradiated with an active energy beam. In general, as a radical-polymerizable composition, a radical-polymerizable composition containing a monomer component constituting the base polymer in various pressure-sensitive adhesives (for example, an acrylic pressure-sensitive adhesive, a rubber-based pressure-sensitive adhesive, a vinyl alkyl ether-based pressure-sensitive adhesive, a silicone-based pressure-sensitive adhesive, a polyester-based pressure-sensitive adhesive, a polyamide-based pressure-sensitive adhesive, a urethane-based pressure-sensitive adhesive, a fluorinated pressure-sensitive adhesive or an epoxy-based pressure-sensitive adhesive); and a photopolymerization initiator may be used.

Of these, a radical-polymerizable composition containing a monomer component constituting the base polymer in an acrylic pressure-sensitive adhesive (an acrylic polymer having a (meth)acrylic acid ester as the main monomer component) and a photopolymerization initiator (hereinafter sometimes referred to as "radical-polymerizable acrylic composition") is preferred.

As the (meth)acrylic acid ester contained in the radical-polymerizable acrylic composition, the above-described (meth)acrylic acid esters constituting the acrylic polymer contained in the above-described acrylic pressure-sensitive adhesive can be appropriately employed. These (meth)acrylic acid esters can be used alone or in combination thereof. Since the (meth)acrylic acid ester is used as the main monomer component of the acrylic polymer, it is important that the amount of the (meth)acrylic acid ester (in particular, an alkyl (meth)acrylate) is, for example, 60 parts by weight or more (preferably 80 parts by weight or more) based on 100 parts by weight of the total monomer components for preparing the acrylic polymer.

In the radical-polymerizable composition, various copolymerizable monomers such as a polar group-containing monomer, a polyfunctional monomer and a thiol monomer may be used. These copolymerizable monomers can be used alone or in combination thereof.

Examples of the polar group-containing monomer include the polar group-containing monomers employed in the above-described acrylic pressure-sensitive adhesives. Of these, acrylic acid is preferred.

In the radical-polymerizable composition, the polar group-containing monomer may or may not be employed. In case where the radical-polymerizable composition is a radical-polymerizable acrylic composition, the amount of the polar group-containing monomer, if employed, is, for example, 30 parts by weight or less (for example, 1 to 30 parts by weight) and preferably 3 to 20 parts by weight based on 100 parts by weight of the total monomer components of the radical-polymerizable acrylic composition. In case where no polar group-containing monomer is used in the radical-polymerizable acrylic composition, the amount thereof is, as a matter of course, 0 part by weight.

Examples of the polyfunctional monomer include the polyfunctional monomers employed in the above-described acrylic pressure-sensitive adhesives. Among all, trimethylolpropane tri(meth)acrylate, hexanediol diacrylate, etc. are preferred.

In the radical-polymerizable composition, although the polyfunctional monomer may or may not be employed, it is preferable to use the polyfunctional monomer. In case where the radical-polymerizable composition is a radical-polymerizable acrylic composition, the amount of the polyfunctional monomer, if employed, is, for example, 0.2 to 10 parts by weight and preferably 0.3 to 6 parts by weight based on 100 parts by weight of the total monomer components of the radical-polymerizable acrylic composition. In case where the amount of the polyfunctional monomer is less than 0.2 part by weight, since the cohesive force is lowered when the pressure-sensitive adhesive layer is peeled off from a film, a part thereof remains on the film, whereby it may be impossible to reuse the film. On the other hand, when the amount of the polyfunctional monomer exceeds 10 parts by weight, since the radical-polymerizable acrylic composition becomes too hard in the curing step, a large force arises due to the curing contraction occurring during the polymerization. As a result, the folded wrinkles generate on the films, whereby it may be impossible to reuse the film.

Although the thiol monomer may or may not be used in the radically polymerizable composition, it is preferable to use it from the viewpoint of improving the reactivity in the atmosphere. The thiol monomer is not particularly restricted so long as being a compound having an SH group in molecule thereof. Examples thereof include lauryl mercaptan, n-octyl mercaptan, α-ethylhexyl mercaptan, 2-mercaptopropionic acid, glycol dimercaptoacetate, glycol dimercaptopropionate and trimethylolpropane trismercaptopropionate. Of these, trimethylolpropane trismercaptopropionate, glycol dimercaptopropionate and the like are preferred.

In case where the radical-polymerizable composition is a radical-polymerizable acrylic composition, for example, the thiol monomer is used in an amount of 0.1 to 1 part by weight and preferably from 0.2 to 0.7 part by weight based on 100 parts by weight of the total monomer components of the radical-polymerizable acrylic composition. When the amount of the thiol monomer is less than 0.1 part by weight, the effect of the addition thereof may not be exerted. On the other hand, when the amount thereof exceeds 1 part by weight, since the molecular weight of the resultant polymer is reduced due to the chain transfer of a radical to the thiol, the cohesive force is lowered. Hence, when the pressure-sensitive adhesive layer is peeled off from a film, a part thereof remains on the film, whereby it may be impossible to reuse the film.

Examples of copolymerizable monomers other than the polar group-containing monomers, polyfunctional monomers and thiol monomers include vinyl esters such as vinyl acetate and vinyl propionate; aromatic vinyl compounds such as styrene and vinyl toluene; olefins or dienes such as ethylene, butadiene, isoprene and isobutylene; vinyl ethers such as vinyl alkyl ethers; vinyl chloride; alkoxyalkyl (meth)acrylate type monomers such as methoxyethyl (meth)acrylate and ethoxyethyl (meth)acrylate; sulfonate group-containing monomers such as sodium vinylsulfonate; phosphate group-containing monomers such as 2-hydroxyethyl acryloyl phosphate; imide group-containing monomers such as cyclohexylmaleimide and isopropylmaleimide; isocyanate group-containing monomers such as 2-methacryloyloxyethyl isocyanate; fluorine atom-containing (meth)acrylates; and silicone atom-containing (meth)acrylates.

The photopolymerization initiator is not particularly restricted and examples thereof include various photopolymerization initiators that are contained in the photopolymerizable acrylic pressure-sensitive adhesive composition which is used in forming the pressure-sensitive adhesive layer as described above.

The amount of the photopolymerization initiator employed is not particularly restricted. For example, in case of a radical-polymerizable acrylic composition, the amount thereof may be selected from the range of 1 to 10 parts by weight (preferably 1 to 5 parts by weight) based on 100 parts by weight of the total monomer components. When the amount of the photopolymerization initiator is less than 1 part by weight, the curing performance in the atmosphere may be worsened. On the other hand, when the amount exceeds 10 parts by weight, since the active energy beam is absorbed by the photopolymerization initiator, the active energy cannot reach the inside of the pressure-sensitive adhesive layer. As a result, since the conversion is lowered or the molecular weight of the resultant polymer is reduced, the cohesive force of the thus formed pressure-sensitive adhesive layer is lowered. Hence, when the pressure-sensitive adhesive layer is peeled off from a film, a part of the pressure-sensitive adhesive layer remains on the film, whereby it may be impossible to reuse the film. These photopolymerization initiator can be used alone or in combination thereof.

Since the radical-polymerizable acrylic composition contains the photopolymerization initiator in a larger amount than in the photopolymerizable acrylic pressure-sensitive adhesive composition as described above, the polymerization can be completed without polymerization inhibition even in case being in contact with the atmosphere.

The photo-cationic-polymerizable composition is not particularly restricted so long as it is a composition capable of undergoing cationic polymerization when irradiated with the active energy beam. A photo-cationic-polymerizable composition including a photo-cationic polymerization initiator and a photo-cationic-polymerizable compound is usually employed.

The photo-cationic polymerization initiator is not particularly restricted so long as it is activated by the irradiation with the active energy beam to thereby derive a cationic-polymerizable group. Examples thereof include onium salt-based photopolymerization initiators (onium salts) and organic metal complexes. It is also possible to use a photo sensitizer too.

Examples of the onium salt-based photopolymerization initiator include the onium salt photopolymerization initiator disclosed in JP-A-06-32873, the onium salt-based photopolymerization initiator disclosed in JP-A-2000-281965, the onium salt-based photopolymerization initiator disclosed in JP-A-11-228702 and the onium salt-based photopolymerization initiator disclosed in JP-B-8-26120. As these onium salt-based photopolymerization initiators, a diaryl iodonium salt, a triaryl sulfonium salt, a triaryl selenonium salt, a tetraaryl phosphonium salt, an aryl diazonium salt and the like may be mentioned. As the onium salt-based photopolymerization initiator, a diaryl iodonium salt is preferred.

More specifically, a compound represented by "$Y_2I^+X^-$ (in which Y represents an optionally substituted aryl group; and $X^-$ is a non-nucleophilic and non-basic anion)" can be cited as the diaryl iodonium salt. Examples of the non-nucleophilic and non-basic anion represented by $X^-$ include $SbF_6^-$, $SbCl_6^-$, $BF_4^-$, $[B(C_6H_5)_4]^-$, $[B(C_6F_5)_4]^-$, $[B(C_6H_4CF_3)_4]^-$, $[(C_6F_5)_2BF_2]^-$, $[C_6F_5BF_3]^-$, $[B(C_6H_3F_2)_4]^-$, $AsF_6^-$, $PF_6^-$, $HSO_4^-$ and $ClO_4^-$.

As such an anion, an antimony-based anion or a boron-based anion is preferred.

As the triaryl sulfonium salt, triaryl selenonium salt, tetraaryl phosphonium salt and aryl diazonium salt, compounds corresponding to the diaryl iodonium salts as described above may be mentioned. More specifically, as the triaryl sulfonium salt, triaryl selenonium salt, tetraaryl phosphonium salt and aryl diazonium salt, compounds represented by "$Y_3S^+X^-$", "$Y_3Se^+X^-$", "$Y_4P^+X^-$" and "$YN_2^+X^-$" (wherein Y and $X^-$ are as defined above) respectively may be mentioned.

As the onium salt-based photopolymerization initiator, an antimony atom-containing photopolymerization initiator (antimony-based photopolymerization initiator) and a boron atom-containing photopolymerization initiator (boron-based photopolymerization initiator) may be mentioned. In particular, a diaryl iodonium salt-based photopolymerization initiator containing antimony atom and a diaryl iodonium salt-based photopolymerization initiator containing boron atom are preferred.

Examples of the organic metal complex include an iron-allene complex, a titanocene complex and an arylsilanol-aluminum complex.

The amount of the photo-cationic-polymerization initiator employed is not particularly restricted. When the photo-cationic-polymerizable composition contains the following photo-cationic-polymerizable compound alone as the polymerizable component, for example, the amount of the photo-cationic polymerization initiator can be selected from the range of 0.01 to 5 parts by weight (preferably 0.1 to 4 parts by weight) based on 100 parts by weight of the photo-cationic-polymerizable compound. When the amount of the photo-cationic-polymerization initiator is less than 0.01 part by weight, since the cationic polymerization reaction of the cationic-polymerizable group cannot sufficiently proceed even though it has been activated by the action of light, the heat resistance and water absorption ratio after the polymerization insufficient. On the other hand, when the amount of the photo-cationic-polymerization initiator exceeds 5 parts by weight, the progress of the polymerization cannot be improved any more and, on the contrary, other characteristics such as heat resistance may be worsened.

As the photo-cationic-polymerizable compound, an epoxy compound, an oxetane compound, an oxolane compound, a cyclic acetal compound, a spiroorthoester compound, which is the product of a reaction between an epoxy compound and lactone and the like may be mentioned. Of these, an oxetane compound, an epoxy compound and the like are preferred. These compounds can be used alone or in combination thereof.

Examples of the epoxy compound include bisphenol A diglycidyl ether; bisphenol F diglycidyl ether; bisphenol S diglycidyl ether; brominated bisphenol A diglycidyl ether; brominated bisphenol F diglycidyl ether; brominated bisphenol S diglycidyl ether; an epoxy novolak resin; hydrogenated bisphenol A diglycidyl ether; hydrogenated bisphenol F diglycidyl ether; hydrogenated bisphenol S diglycidyl ether; 3,4-epoxycyclohexylmethyl-3',4'-epoxycyclohexanecarboxylate; 2-(3,4-epoxycyclohexyl-5,5-spiro-3,4-epoxy)cyclohexane-meta-dioxane; bis(3,4-epoxycyclohexylmethyl)adipate; vinylcyclohexene oxide; 4-vinylepoxycyclohexane; bis(3,4-epoxy-6-methylcyclohexylmethyl)adipate; 3,4-epoxy-6-methylcyclohexyl-3',4'-epoxy-6'-methylcyclohexanecarboxylate; methylenebis (3,4-epoxycyclohexane); dicyclopentadiene diepoxide; di(3,4-epoxycyclohexylmethyl)ether of ethylene glycol; ethylenebis (3,4-epoxycyclohexanecarboxylate); dioctyl epoxyhexahydrophthalate; di-2-ethylhexyl epoxyhexahydrophthalate; 1,4-butanediol diglycidyl ether; 1,6-hexanediol diglycidyl ether; glycerol triglycidyl ether; trimethyloipropane triglycidyl ether; polyethylene glycol diglycidyl ether; polypropylene glycol diglycidyl ethers; polydiglycidyl ethers of a polyether polyol obtained by adding one or more alkylene oxides to an aliphatic polyhydric alcohol such as ethylene glycol, propylene glycol, and glycerol; diglycidyl esters of an aliphatic long-chain dibasic acid; monodiglycidyl ethers of an aliphatic higher alcohol; monodiglycidyl ethers of phenol, cresol, butyl phenol, or a polyether alcohol obtained by adding an alkylene oxide to these compounds; glycidyl esters of a higher fatty acid; epoxidated soybean oil; butyl epoxystearic acid; octyl epoxystearic acid; epoxidated linseed oil; and epoxidated polybutadiene.

The oxetane compound may be used without specific restriction so long as being a compound having one or more oxetane rings in the molecule thereof. Specific examples thereof include various oxetane compounds disclosed in JP-A-8-85775, JP-A-8-134405 and the like. Of these compounds, a compound having one to several oxetanyl groups is preferred.

Examples of monofunctional oxetane include 3-ethyl-(hydroxymethyl)oxetane, 3-ethyl-3-[(phenoxy)methyl]oxetane, 3-ethyl-3-(hexyloxymethyl)oxetane, 3-ethyl-3-(2-ethylhexyloxymethyl)oxetane and 3-ethyl-3-(chloromethyl)oxetane. Examples of a bifunctional oxetane include 1,4-bis[(3-ethyl-3-oxetanylmethoxy)methyl]benzene and bis[[1-ethyl (3-oxetanyl)methyl]]ether. Of these, 3-ethyl-3-(2-ethylhexyloxymethyl)oxetane, bis[[1-ethyl(3-oxetanyl) methyl]]ether and the like are preferred.

Examples of the oxolane compound include tetrahydrofuran and 2,3-dimethyltetrahydrofuran.

Examples of the cyclic acetal compound include trioxane, tetraoxane, 1,3-dioxolane, 1,3,5-trioxepane, 1,3-dioxane, ethylene glycol formal, propylene glycol formal, diethylene glycol formal, triethylene glycol formal, 1,4-butanediol formal, 1,5-pentanediol formal and 1,6-hexanediol formal.

Examples of the spiroorthoester compound include the product by a reaction between the above-described epoxy compound and lactone.

The composition for preventing polymerization inhibition such as a radical-polymerizable composition or a photo-cationic-polymerizable composition may contain, if required, various additives as used in the above-described pressure-sensitive adhesive layer.

The layer of the composition for preventing polymerization inhibition is formed in the state of being in contact with the side surface (a part of side face side face part; edge) of the photopolymerizable acrylic pressure-sensitive adhesive composition layer in order to prevent the contact with atmospheric oxygen in the course of producing the pressure-sensitive adhesive layer by irradiating the photopolymerizable acrylic pressure-sensitive adhesive composition layer provided between two films with an active energy beam to thereby photo cure (photopolymerize) the photopolymerizable acrylic pressure-sensitive adhesive composition layer. Accordingly, the thickness of the layer of the composition for preventing polymerization inhibition is not particularly restricted so long as it is the same or more than the thickness of the photopolymerizable acrylic pressure-sensitive adhesive composition layer. In general, the thickness of the layer of the composition for preventing polymerization inhibition is the same as that of the photopolymerizable acrylic pressure-sensitive adhesive composition layer. The width of the layer of the composition for preventing polymerization inhibition is not particularly restricted so long as it can prevent the side surface of the photopolymerizable acrylic pressure-sensitive adhesive composition layer from the contact with atmospheric oxygen. For example, the width is 1 mm to 20 mm (preferably 2 mm to 5 mm). The layer of the composition for preventing polymerization inhibition may have either a monolayer structure or a multilayer structure.

As a method of forming the layer of the composition for preventing polymerization inhibition in the state of being in contact with the side surface of the photopolymerizable acrylic pressure-sensitive adhesive composition layer, for example, a method using a coating device such as a roll coater and a method using an apparatus from which the composition for preventing polymerization inhibition is quantitatively extruded with a pump or the like may be mentioned.

The layer of the composition for preventing polymerization inhibition is polymerized (cured) with the active energy beam to thereby finally form a cured layer.

After the formation of the pressure-sensitive adhesive layer, the above-described cured layer having been formed on the side surface is removed by a cutting or slitting step at an appropriate timing (for example, immediately after the formation of the pressure-sensitive adhesive layer, between the formation of the pressure-sensitive adhesive layer and the processing into the final product such as a pressure-sensitive adhesive tape or sheet, etc.). In the step of removing the above-mentioned cured layer from the side surface of the pressure-sensitive adhesive layer, no undesirable effect such as breakage or wrinkling is exerted on the pressure-sensitive adhesive layer or the film.

The conversion of the above-mentioned cured layer is 85% or more (preferably 90% or more). It is particularly preferable that the conversion thereof is close to 100%. When the conversion is low (for example, less than 80%), Since the unpolymerized monomer remains on the film, the film may be hardly reused.

The conversion of the above-mentioned cured layer is determined by precisely weighing about 0.5 g of the cured layer of the composition for preventing polymerization inhibition, drying it at 130° C. for 2 hours, then precisely weighing it to determine the weight loss (evaporated amount (weight of unpolymerized monomer)), and then substituting the obtained numerical values into the following formula.

Conversion (%) of cured layer of composition for preventing polymerization inhibition=[1−(weight loss)/(weight of cured layer before drying)]×100

Film

The film is not particularly restricted so long as being a film having oxygen-impermeable properties. A transparent film is preferred because of not inhibiting the photopolymerization reaction of the photopolymerizable acrylic pressure-sensitive adhesive composition layer.

As such a film, it is possible to use, for example, a commonly employed release paper or the like. More specifically, as a film, of a substrate having a releasing treated layer (peel treated layer) which is treated with a releasing agent (peeling agent) at least one surface; a low adhesive substrate made of a fluorinated polymer (for example, polytetrafluoroethylene, polychlorotrifluoroethylene, polyvinyl fluoride, polyvinylidene fluoride, tetrafluoroethylene-hexafluoropropylene copolymer or chlorofluoroethylene-vinylidene fluoride copolymer); or a low adhesive substrate made of a non-polar polymer (for example, an olefin-based resin such as polyethylene or polypropylene). In a low adhesive substrate, both faces can be used as release faces. In a substrate having a releasing treated layer, on the other hand, the releasing treated layer face is usable as the release face (releasing treated face).

As the film, it is preferable to use, for example, a film having a releasing treated layer at least one surface of a film substrate (a substrate having a releasing treated layer). Examples of such a film substrate include: plastic-based films (synthetic resin films) such as a polyester film (a polyethylene terephthalate film and the like), an olefin-based resin film (a polyethylene film, a polypropylene film and the like), a polyvinyl chloride film, a polyimide film, a polyamide film (a nylon film) and a rayon film; papers (woodfree paper, Japanese paper, craft paper, glassine paper, synthetic paper, topcoat paper, etc.); and multilayered materials (two- or three-layered complexes) produced by laminating or co-extruding these materials. As the film substrate, a plastic-based film having a high transparency (in particular, a polyethylene terephthalate film) can be preferably employed.

The releasing agent is not particularly restricted. As the releasing agent, for example, a silicone-based releasing agent, a fluorinated releasing agent, a long-chain alkyl-based releasing agent and the like may be mentioned. These releasing agents can be used alone or in combination thereof. A film having been releasing treated with the releasing agent can be formed by, for example, a publicly known formation method.

The thickness of the film is not particularly restricted. From the viewpoints of easiness in handling and economic efficiency, the thickness may be selected from the range of, for example, 12 to 250 μm (preferably 20 to 200 μm). The film may have either a monolayer structure or a multilayer structure.

It is also possible that one of the films is a substrate having no release properties for the formed pressure-sensitive adhesive layer. In case of using such a substrate as one of the films in the present invention, a laminate having the pressure-sensitive adhesive layer between two films becomes a pressure-sensitive adhesive sheet having a substrate in which the pressure-sensitive adhesive layer is provided on one surface of the substrate and the pressure-sensitive adhesive face is protected with the film. In the present invention, therefore, a pressure-sensitive adhesive sheet having a substrate can be produced by using the above-described substrate as one of the films.

As the substrate which is used as such a pressure-sensitive adhesive sheet having a substrate, for example, the film substrates as described above may be mentioned. To improve the adhesiveness between the pressure-sensitive adhesive layer and the substrate, the surface of the substrate may be subjected to a commonly employed surface treatment, for example, a chemical or physical oxidation treatment such as corona treatment, chromic acid treatment, exposure to ozone, exposure to flame, exposure to a high-voltage electrical shock or ionic radiation treatment. As the substrate, it is preferable to use one not inhibiting the penetration of the active energy beam.

Process for Producing Pressure-Sensitive Adhesive Layer

In the present invention, a pressure-sensitive adhesive layer is formed by irradiating a photopolymerizable acrylic pressure-sensitive adhesive composition layer provided between two films with an active energy beam to thereby photo cure the photopolymerizable acrylic pressure-sensitive adhesive composition layer. In order to avoid the problem that, when a film is peeled off after forming the pressure-sensitive adhesive layer, a part of the side surface of the pressure-sensitive adhesive layer remains on the film and thus it is difficult to reuse the film, it is important to form a layer of a composition for preventing polymerization inhibition, which can prevent polymerization inhibition by atmospheric oxygen at the side surface of the photopolymerizable acrylic pressure-sensitive adhesive composition during the photopolymerization, in such a state that the composition for preventing polymerization inhibition is in contact with the side surface of the photopolymerizable acrylic pressure-sensitive adhesive composition layer and then conduct the irradiation with the active energy beam while maintaining this state.

As the method of forming a photopolymerizable acrylic pressure-sensitive adhesive composition layer between two films, the publicly known and commonly employed methods may be mentioned. For example, a method which includes coating a photopolymerizable acrylic pressure-sensitive adhesive composition on a film to form a photopolymerizable acrylic pressure-sensitive adhesive composition layer and then providing a film on this photopolymerizable acrylic pressure-sensitive adhesive composition layer; or a method which includes directly forming a photopolymerizable acrylic pressure-sensitive adhesive composition layer between two films may be mentioned.

As the method of forming a layer of the composition for preventing polymerization inhibition being in contact with the side surface of the photopolymerizable acrylic pressure-sensitive adhesive composition layer, there can be enumerated a method using a coating device such as a roll coater, a method using an apparatus from which the composition for preventing polymerization inhibition is quantitatively extruded with a pump or the like, a method using a film on which a layer of a composition for preventing polymerization inhibition has been preliminarily formed, and the like may be mentioned.

More specifically, the pressure-sensitive adhesive layer can be formed by, for example, the following method in the present invention. A photopolymerizable acrylic pressure-sensitive adhesive composition, which is adjusted to a coatable viscosity if necessary, is coated on the releasing treated surface of a film by using a coating device such as a roll coater to form a photopolymerizable acrylic pressure-sensitive adhesive composition layer. Next, another film is provided so that the releasing treated surface of the film is in contact with the photopolymerizable acrylic pressure-sensitive adhesive composition layer. Before irradiating the photopolymerizable acrylic pressure-sensitive adhesive composition layer with an active energy beam, a composition for preventing polymerization inhibition is filled by using an apparatus, by which the composition for preventing polymerization inhibition can be quantitatively extruded with a pump and which is provided with a syringe at the front end, and introducing the syringe in the vicinity of the side surface of the photopolymerizable acrylic pressure-sensitive adhesive composition layer which has been formed between the two films. After thus forming a layer of the composition for preventing polymerization inhibition being in contact with the side surface of the photopolymerizable acrylic pressure-sensitive adhesive composition layer provided between the two films, the photopolymerizable acrylic pressure-sensitive adhesive composition layer is irradiated with the active energy beam to form the pressure-sensitive adhesive layer.

In the present invention, the pressure-sensitive adhesive layer is formed by using a sheet in which a photopolymerizable acrylic pressure-sensitive adhesive composition layer is formed between two films (hereinafter sometimes referred to as "photopolymerizable acrylic pressure-sensitive adhesive composition layer sheet"). Further, the photopolymerizable acrylic pressure-sensitive adhesive composition in the photopolymerizable acrylic pressure-sensitive adhesive composition layer sheet as described above for forming the pressure-sensitive adhesive layer is photopolymerized in the state of having a layer of a composition for preventing polymerization inhibition on the side surface. Therefore, the polymerization inhibition by atmospheric oxygen at the side surface of the photopolymerizable acrylic pressure-sensitive adhesive composition during the photopolymerization can be prevented. As a result, it is possible to prevent a lowering in the cohesive force in the side surface of the thus formed pressure-sensitive adhesive layer caused by a lowering in the polymerization degree at the side surface of the photopolymerizable acrylic pressure-sensitive adhesive composition layer. Thus, a part of the side surface of the pressure-sensitive adhesive layer never remains on the film in peeling off the film from the pressure-sensitive adhesive layer. Although the layer of the composition for preventing polymerization inhibition formed on the side surface of the photopolymerizable acrylic pressure-sensitive adhesive composition layer also cures due to the active energy beam to form a cured layer, the layer of the composition for preventing polymerization inhibition and the cured layer cause neither wrinkles in the film or residue of the pressure-sensitive adhesive components (adhesive residue) on the film.

FIG. 1 is a schematic cross-sectional view showing an example of the photopolymerizable acrylic pressure-sensitive adhesive composition layer sheet which corresponds to the schematic cross-sectional view of a photopolymerizable acrylic pressure-sensitive adhesive composition layer sheet immediately after forming layers of a composition for preventing polymerization inhibition being in contact with the side surfaces of a photopolymerizable acrylic pressure-sensitive adhesive composition layer, before the irradiation with an active energy beam.

In FIG. 1, 1 stands for a photopolymerizable acrylic pressure-sensitive adhesive composition layer sheet provided with layers of a composition for preventing polymerization inhibition; 11 stands for films; 12 stands for a photopolymerizable acrylic pressure-sensitive adhesive composition layer; and 13 stands for the layers of the composition for preventing polymerization inhibition. In the photopolymerizable acrylic pressure-sensitive adhesive composition layer sheet shown in FIG. 1, the photopolymerizable acrylic pressure-sensitive adhesive composition layer is covered with films in both surfaces and the both side surfaces thereof are in contact with the layers of the composition for preventing polymerization inhibition, thereby being blocked from atmospheric oxygen.

In FIG. 1, the both ends of the films 11 and the layers of the composition for preventing polymerization inhibition 13 do not conform with each other. That is, the width of the films 11 is larger than the sum of the widths of the photopolymerizable acrylic pressure-sensitive adhesive composition layer 12 and two layers of the composition for preventing polymerization inhibition 13. However, since the films 11 are provided for preventing the surfaces of the photopolymerizable acrylic pressure-sensitive adhesive composition layer 12 from contact with oxygen, the width of the films 11 is not particularly restricted so long as being larger than the width of the photopolymerizable acrylic pressure-sensitive adhesive composition layer 12. Therefore, the both surfaces of the layers of the composition for preventing polymerization inhibition 13 may be either entirely covered with the films 11 as in FIG. 1, or partly covered, or not covered with the films 11. From the viewpoint of handling, it is preferred that the width of the films 11 is larger than the sum of the widths of the photopolymerizable acrylic pressure-sensitive adhesive composition layer 12 and two layers of the composition for preventing polymerization inhibition 13.

Since the widths of the two films 11 are not restricted so long as being capable of preventing the surfaces of the photopolymerizable acrylic pressure-sensitive adhesive composition layer 12 from the contact with oxygen, they may be either the same as in FIG. 1 or different.

Consequently, in the present invention, it is possible to reuse the films. The pressure-sensitive adhesive layer that is formed according to the present invention is usable as a pressure-sensitive adhesive layer in a pressure-sensitive tape or sheet such as a substrate-less double-faced pressure-sensitive adhesive sheet or a pressure-sensitive adhesive sheet having a substrate without showing a lowering in the cohesive force in the side surface of the pressure-sensitive adhesive layer.

EXAMPLES

The present invention will be described based on Examples as follows. However, the present invention is not restricted thereto.

Example of the Use of Film

As a film, a polyethylene terephthalate film having been releasing treated on one surface (PET film "Lumirror™ S-10", manufactured by TORAY, thickness 38 μm) is used.

Example of the Production of Photopolymerizable Acrylic Pressure-Sensitive Adhesive Composition Layer Sheet 90 parts by weight of 2-ethylhexyl acrylate, 10 parts by weight of acrylic acid and 0.1 part by weight of a photopolymerization initiator ("Irgacure™ 651" manufactured by Ciba Specialty Chemicals) were fed into a four-necked flask, and photopolymerized by exposing to UV light under a nitrogen atmosphere to obtain a partly polymerized syrup having a conversion of 7%.

This partly polymerized syrup was coated on the releasing treated surface of the above-described film so as to obtain a thickness after forming the pressure-sensitive adhesive layer of 1000 μm. After forming the pressure-sensitive adhesive layer, the above-described film was bonded onto the photopolymerizable acrylic pressure-sensitive adhesive composition layer while the photopolymerizable acrylic pressure-sensitive adhesive composition layer is in contact with the releasing treated surface of the above-described film to obtain a photopolymerizable acrylic pressure-sensitive adhesive composition layer sheet.

Example of the Preparation of Composition for Preventing Polymerization Inhibition Compositions for preventing polymerization inhibition employed in Examples 1 to 11 and Comparative Examples 1 and 2 were prepared by blending 2-ethylhexyl acrylate, a photopolymerization initiator ("Irgacure™ 651" manufactured by Ciba Specialty Chemicals), trimethylolpropane triacrylate and trimethylolpropane trismercarptopropionate at the ratios as listed in the following Table 1.

TABLE 1

|  |  | 2EHA | TMPTA | 3-SH | Irg-651 |
|---|---|---|---|---|---|
| Example | 1 | 99 | 1 | — | 2 |
|  | 2 | 99 | 1 | — | 3 |
|  | 3 | 99 | 1 | — | 8 |
|  | 4 | 99.7 | 0.3 | — | 3 |

TABLE 1-continued

|  |  | 2EHA | TMPTA | 3-SH | Irg-651 |
|---|---|---|---|---|---|
|  | 5 | 99.5 | 0.5 | — | 3 |
|  | 6 | 95 | 5 | — | 3 |
|  | 7 | 92 | 8 | — | 3 |
|  | 8 | 99 | 1 | 0.1 | 2 |
|  | 9 | 99 | 1 | 0.3 | 2 |
|  | 10 | 99 | 1 | 0.5 | 2 |
|  | 11 | 99 | 1 | 0.8 | 2 |
| Comparative | 1 | 99 | 1 | — | 0.5 |
| Example | 2 | 99 | 1 | — | 12 |

In Table 1, 2EHA stands for 2-ethylhexyl acrylate, Irg651 stands for Irgacure 651, TMPTA stands for trimethylolpropane triacrylate and 3-SH stands for trimethylolpropane tris-mercaptopropionate, respectively.

Example 1

By using an apparatus, by which the composition for preventing polymerization inhibition could be quantitatively extruded with a pump, provided with a syringe at the front end, the syringe was introduced in the vicinity of the side surfaces of the photopolymerizable acrylic pressure-sensitive adhesive composition layer of the above-described photopolymerizable acrylic pressure-sensitive adhesive composition layer sheet. And then, the syringe was filled with the composition for preventing polymerization inhibition to be used in Example 1. Thus, layers of the composition for preventing polymerization inhibition (thickness: the same as the thickness of the photopolymerizable acrylic pressure-sensitive adhesive composition layer, width: 2 mm or 5 mm) were formed being in contact with the side surfaces of the photopolymerizable acrylic pressure-sensitive adhesive composition layer.

Next, the photopolymerizable acrylic pressure-sensitive adhesive composition layer was irradiated with UV light in black light (illuminance: 4 mW/cm$^2$) via the film for 3 minutes to thereby cure the photopolymerizable acrylic pressure-sensitive adhesive composition layer. Thus, a pressure-sensitive adhesive layer was formed between the two films.

Examples 2 to 11

Pressure-sensitive adhesive layers were formed between two films in the same manner as in Example 1, except for using the compositions for preventing polymerization inhibition corresponding to the individual Examples.

Example 12

A pressure-sensitive adhesive layer was formed between two films in the same manner as in Example 1, except for using a cationic-curable pressure-sensitive adhesive "ARONTACK UVA-1201" (manufactured by TOA GOSEI Co., Ltd.) as the composition for preventing polymerization inhibition. This cationic-curable pressure-sensitive adhesive "ARONTACK UVA-1201" includes 3-ethyl-3-(2-ethylhexyloxymethyl)oxetane as the main component.

Comparative Examples 1 and 2

Pressure-sensitive adhesive layers were formed each between two films in the same manner as in Example 1, except for using the compositions for preventing polymerization inhibition corresponding to the individual Comparative Examples.

Comparative Example 3

A pressure-sensitive adhesive layer was formed between two films in the same manner as in Example 1, except for forming a layer of composition for preventing polymerization inhibition.

Evaluation

Using the laminates of Examples and Comparative Examples each having a pressure-sensitive adhesive layer provided between two films, the adhesive residue, film wrinkles and the photo curability of the side surface of the photopolymerizable acrylic pressure-sensitive adhesive composition layer were evaluated or measured by a method of evaluating adhesive residue, a method of evaluating film wrinkles and a method of evaluating the photo curability of the side surface of the photopolymerizable acrylic pressure-sensitive adhesive composition layer. Moreover, the conversion of the each composition for preventing polymerization inhibition employed in Examples and Comparative Examples was measured by the following method of measuring the conversion of a composition for preventing polymerization inhibition. Table 2 shows the results.

Method of Measuring the Conversion of Composition for Preventing Polymerization Inhibition A Teflon™ plate (spacer) of 0.8 mm in thickness having a rectangular hole (10 cm in lengthwise and 5 cm in widthwise) was placed on the releasing-treated surface of the film as described above, and the rectangular hole was filled with a composition for preventing polymerization inhibition. Next, the above-described film was provided so that the releasing-treated surface came into contact with the Teflon™ plate. This composition for preventing polymerization inhibition of the spacer sandwiched between the above-described films was irradiated with UV light (illuminance: 4 mW/cm$^2$) from one surface via the film for 3 minutes to thereby cure the composition for preventing polymerization inhibition. Thus, a cured layer was obtained. This cured layer was cut into a piece in a definite size and weighed to give the initial weight. Next, the cured layer cut into the definite size was dried at 120° C. for 2 hours. After drying, it was weighed to give the weight after drying. Then, the conversion was determined in accordance with the following formula.

$$(\text{Conversion}) = (\text{weight after drying})/(\text{initial weight}) \times 100$$

Method of Evaluating Adhesive Residue

One of the films of a laminate having a pressure-sensitive adhesive layer provided between two films was peeled off. Then, evaluation was made by referring a case in which nothing remained on the peeled film as to "A", a case in which not the cured layer (adhesive) but a liquid remained on the film and no undesirable effect was exerted on the reuse of the film as to "B", and a case in which a part of the cured layer (adhesive) formed by curing the layer of the composition for preventing polymerization inhibition remained on the film and undesirable effects were exerted on the reuse of the film as to "C".

Method of Evaluating Film Wrinkles

One of the films of a laminate having a pressure-sensitive adhesive layer provided between two films was peeled off and the peeled film was observed. Then, evaluation was made by referring a case in which no sign of wrinkling was observed as to "A", and a case in which a sign of wrinkling was observed as to "B".

In Table 2, the data given in the column "Wrinkles in film: Width 2 mm" show the results of the evaluation on the samples having the layer of the composition for preventing polymerization inhibition, which was provided in contact with the side surface of the photopolymerizable acrylic pressure-sensitive adhesive composition layer, of 2 mm in width. On the other hand, the data given in the column "Wrinkles in film: Width 5 mm" show the results of the evaluation on the samples having the layer of the composition for preventing polymerization inhibition of 5 mm in width.

Method of Evaluating the Photo Curability of Side Surface of Photopolymerizable Acrylic Pressure-Sensitive Adhesive Composition Layer One of the films of a laminate having a pressure-sensitive adhesive layer provided between two films was peeled off. In this step, a case in which no pressure-sensitive adhesive layer remained on the film was referred to as "A" and a case in which the side surface of the pressure-sensitive adhesive layer had not been sufficiently polymerized and stringiness was observed was referred to as "B".

TABLE 2

|  |  | Conversion (%) | Adhesive residue | Wrinkles in film | | Photo curability of side surface of photopolymerizable acrylic pressure-sensitive adhesive composition layer |
|---|---|---|---|---|---|---|
|  |  |  |  | Width 2 mm | Width 5 mm |  |
| Example | 1 | 93.1 | B | A | A | A |
|  | 2 | 96.8 | A | A | A | A |
|  | 3 | 87.6 | B | A | A | A |
|  | 4 | 97.2 | B | A | A | A |
|  | 5 | 98.1 | B | A | A | A |
|  | 6 | 97.5 | A | A | A | A |
|  | 7 | 98.7 | A | A | B | A |
|  | 8 | 93.9 | B | A | A | A |
|  | 9 | 96.4 | A | A | A | A |
|  | 10 | 98.6 | A | A | A | A |
|  | 11 | 98.9 | B | A | A | A |
|  | 12 | 98.5 | A | A | A | A |
| Comparative Example | 1 | 75.3 | C | A | A | B |
|  | 2 | 81.6 | C | A | A | B |
|  | 3 | — | C | A | A | B |

It was confirmed that, in Examples 1 to 12, neither adhesive residue nor wrinkling caused by the composition for preventing polymerization inhibition occurred on the film, when the film was peeled off from the pressure-sensitive adhesive layer after the formation of the pressure-sensitive adhesive layer. Moreover, there was no problem in the photocurability of the side surface of the photopolymerizable acrylic pressure-sensitive adhesive composition layer and the side surface of the pressure-sensitive adhesive layer did not remain on the film.

Although the present invention has been described in detail by referring specific embodiments, it is clear for a person skilled in the art that various changes and modifications can be made without departing from the spirit and scope of the present invention.

The present application is based on Japanese prior patent filed on Feb. 5, 2007 (Japanese Patent Application No. 2007-025116) the entire contents of which are hereby incorporated by reference.

All references cited herein are entirely incorporated.

INDUSTRIAL APPLICABILITY

According to the process for producing a pressure-sensitive adhesive layer of the present invention, owing to the construction as discussed above, it is possible to reuse a film. Moreover, it is possible to prevent a lowering in the cohesive force in the side surface of the thus formed pressure-sensitive adhesive layer caused by a lowering in the polymerization degree in the side surface of the photopolymerizable acrylic pressure-sensitive adhesive composition layer at the photopolymerization.

The invention claimed is:

1. A process for producing a pressure-sensitive adhesive layer, which comprises:
   irradiating a photopolymerizable acrylic pressure-sensitive adhesive composition layer provided between two films with an active energy beam to polymerize the photopolymerizable acrylic pressure-sensitive adhesive composition layer,
   wherein the polymerization is performed while a layer of a composition for preventing polymerization inhibition which is curable with an active energy beam in the atmosphere is provided on a side surface of the photopolymerizable acrylic pressure-sensitive adhesive composition layer.

2. The process for producing a pressure-sensitive adhesive layer according to claim 1, wherein a distance between the two films is 0.2 mm or more.

3. The process for producing a pressure-sensitive adhesive layer according to claim 1, wherein the composition for preventing polymerization inhibition is a photo-cationic-polymerizable composition.

4. The process for producing a pressure-sensitive adhesive layer according to claim 3, wherein the photo-cationic-polymerizable composition contains an oxetane compound or an epoxy compound.

5. The process for producing a pressure-sensitive adhesive layer according to claim 1, wherein the composition for preventing polymerization inhibition is a radical-polymerizable composition containing 1 to 10 parts by weight of a photopolymerization initiator based on 100 parts by weight of total monomer components.

6. The process for producing a pressure-sensitive adhesive layer according to claim 5, wherein the radical-polymerizable composition further contains 0.2 to 10 parts by weight of a polyfunctional monomer based on 100 parts by weight of the total monomer components.

7. The process for producing a pressure-sensitive adhesive layer according to claim 5, wherein the radical-polymerizable composition further contains 0.1 to 1 part by weight of a thiol monomer based on 100 parts by weight of the total mon.

* * * * *